United States Patent
Man et al.

(10) Patent No.: US 12,443,189 B2
(45) Date of Patent: Oct. 14, 2025

(54) CONTROL METHOD AND CONTROL DEVICE OF CLEANING EQUIPMENT

(71) Applicant: YITUO ELECTRIC CO., LTD., Guangdong (CN)

(72) Inventors: Xianggu Man, Guangdong (CN); Lin Zhang, Guangdong (CN); Jialiu Yi, Guangdong (CN); Wenzhi Xie, Guangdong (CN); Jianquan Huang, Guangdong (CN); Fan Yang, Guangdong (CN); Xiating Chen, Guangdong (CN)

(73) Assignee: YITUO ELECTRIC CO., LTD., Foshan (CN)

( * ) Notice: Subject to any disclaimer, the term of this patent is extended or adjusted under 35 U.S.C. 154(b) by 705 days.

(21) Appl. No.: 17/701,652

(22) Filed: Mar. 22, 2022

(65) Prior Publication Data
US 2022/0229440 A1     Jul. 21, 2022

Related U.S. Application Data

(63) Continuation of application No. PCT/CN2021/083435, filed on Mar. 26, 2021.

(30) Foreign Application Priority Data

Jan. 19, 2021  (CN) .......................... 202110069981.5

(51) Int. Cl.
*G05D 1/00* (2024.01)
*E04H 4/16* (2006.01)

(52) U.S. Cl.
CPC ......... *G05D 1/0214* (2013.01); *E04H 4/1654* (2013.01); *G05D 1/0242* (2013.01); *G05D 1/027* (2013.01)

(58) Field of Classification Search
CPC .... G05D 1/0214; G05D 1/0242; G05D 1/027; E04H 4/1654
See application file for complete search history.

(56) References Cited

U.S. PATENT DOCUMENTS

| | | | |
|---|---|---|---|
| 2008/0191653 A1* | 8/2008 | Han | A47L 9/00 701/25 |
| 2011/0226282 A1* | 9/2011 | Choi | A47L 9/009 134/18 |

(Continued)

FOREIGN PATENT DOCUMENTS

| | | |
|---|---|---|
| CN | 109567678 A | 4/2019 |
| CN | 111802962 A | 10/2020 |

*Primary Examiner* — Mohamad O El Sayah (57) ABSTRACT

Disclosed herein is a control method and a control device of cleaning equipment, the method including: controlling the cleaning equipment to stop running straight, when a collected first ADC value is greater than a first preset value; and then controlling the cleaning equipment to turn in a preset direction, then controlling the cleaning equipment to stop turning, when a collected second ADC value is less than a second preset value; and then calculating a first turn angle and a first running distance; next, controlling the cleaning equipment to run straight forward for the first running distance and then stop running straight, and finally controlling the cleaning equipment to turn the first turn angle in the preset direction, then controlling the cleaning equipment to run straight. By adopting embodiments of the present disclosure, efficiency and precision of cleaning equipment in cleaning a pool can be improved.

3 Claims, 4 Drawing Sheets

(56) References Cited

U.S. PATENT DOCUMENTS

| | | | |
|---|---|---|---|
| 2019/0243379 A1* | 8/2019 | Attar | E04H 4/1654 |
| 2020/0114517 A1* | 4/2020 | Wang | B25J 11/0085 |
| 2020/0178750 A1* | 6/2020 | Lin | G05D 1/0238 |
| 2020/0183404 A1* | 6/2020 | Lin | G01S 15/88 |
| 2020/0241550 A1* | 7/2020 | Lin | G05D 1/0242 |
| 2020/0331148 A1* | 10/2020 | Zhang | G05D 1/249 |
| 2020/0359871 A1* | 11/2020 | Feng | A47L 11/4061 |
| 2021/0041871 A1* | 2/2021 | Lai | A47L 9/009 |
| 2022/0010573 A1* | 1/2022 | Torem | E04H 4/1654 |
| 2024/0310856 A1* | 9/2024 | He | G01C 21/00 |

* cited by examiner

CONTROL METHOD AND CONTROL DEVICE OF CLEANING EQUIPMENT

CROSS REFERENCE TO RELATED APPLICATIONS

The present application is a Continuation Application of PCT Application No. PCT/CN2021/083435 filed on Mar. 26, 2021, which claims the benefit of Chinese Patent Application No. 202110069981.5 filed on Jan. 19, 2021. All the above are hereby incorporated by reference in their entirety.

TECHNICAL FIELD

The present disclosure relates to a field of robot control, in particular to a control method and a control device of cleaning equipment.

BACKGROUND

Conventional pool cleaning relies on manual waste removal and manual pool flushing, which is inefficient and ineffective. With a popularization of smart life, demanding for automatic cleaning equipment is increasing day by day. Automatic cleaning robots that have appeared in the past 20 years have solved the problem of automation of the pool cleaning to a certain extent.

However, conventional cleaning equipment in the prior art can only perform a "square wave" shaped cleaning path with a 90-degree turn. The conventional cleaning equipment is only suitable for a rectangular pool. When working on a bottom of an irregularly shaped pool, a side of the cleaning equipment is not parallel to a side of a pool wall after a 90-degree turn of the cleaning equipment, leaving some areas near a shorter side of the "square wave" shape not cleaned, resulting in over-cleaning in a central area of the pool, and insufficient cleaning in a border area of the pool, resulting in a low cleaning efficiency. And the cleaning equipment in the prior art determines whether it touches the pool wall or not only by means of a gyroscope, and cannot measure a distance and an angle to the pool wall in advance. Thus, the cleaning equipment performs a brake after touching the pool wall, which causes a posture and a path of the cleaning equipment to change and deviate at the moment of the touching, resulting in a deviation from a preset path of the cleaning equipment.

SUMMARY

The present disclosure provides a control method and a control device of cleaning equipment, and the control method improves efficiency and precision of the cleaning equipment in cleaning pools.

A first aspect of embodiments of the present disclosure provides a control method of cleaning equipment, wherein the cleaning equipment is provided with an infrared sensor and an angular velocity sensor; the control method may include: when the cleaning equipment is running straight, acquiring a first ADC (analog to digital converter) value collected by means of the infrared sensor in real-time, and when the first ADC value is greater than a first preset value, controlling the cleaning equipment to stop running straight;
controlling the cleaning equipment to turn in a preset direction and acquiring a second ADC value collected by means of the infrared sensor in real-time, and once the second ADC value is less than a second preset value, then controlling the cleaning equipment to stop turning;
calculating a first turn angle and a first running distance based on angle data uploaded by means of the angular velocity sensor; wherein the angular velocity sensor may be configured to collect an angle between a running direction of the cleaning equipment and an obstacle ahead;
controlling the cleaning equipment to run straight forward for the first running distance and then stop running straight, then controlling the cleaning equipment to turn the first turn angle in the preset direction, and then controlling the cleaning equipment to run straight.

In a possible implementation of the first aspect, calculating the first turn angle and the first running distance based on the angle data uploaded by means of the angular velocity sensor, wherein the calculating the first turn angle may be specifically:
when the first ADC value is greater than the first preset value, controlling the cleaning equipment to stop running straight, and controlling the angular velocity sensor to collect an angle between the running direction of the cleaning equipment and the obstacle ahead, and recording the angle as a first angle;
controlling the cleaning equipment to turn in the preset direction until the second ADC value collected by means of the infrared sensor in real-time is less than the second preset value, controlling the cleaning equipment to stop turning, and then controlling the angular velocity sensor to collect an angle between the running direction of the cleaning equipment and the obstacle ahead, and recording the angle as a second angle;
calculating the first turn angle based on the angle data of the first angle and the second angle uploaded by means of the angular velocity sensor; the first turn angle may be an absolute value of a difference between the first angle and the second angle.

In a possible implementation of the first aspect, calculating the first turn angle and the first running distance based on the angle data uploaded by means of the angular velocity sensor, wherein the calculating the first running distance may be specifically:

$$L1 = S/\sin(|\alpha 1 - \alpha 2|)$$

wherein L1 represents the first running distance, α1 represents the first angle, α2 represents the second angle, and S represents a set distance.

A second aspect of the embodiments of the present disclosure provides a control device of the cleaning equipment, wherein the cleaning equipment may be provided with an infrared sensor and an angular velocity sensor; the control device may include: a brake module, a first turn module, a calculation module, a run straight module, and a second turn module;
the brake module may be configured to acquire a first ADC value collected by means of the infrared sensor in real-time when the cleaning equipment is running straight, and control the cleaning equipment to stop running straight when the first ADC value is greater than a first preset value;
the first turn module may be configured to control the cleaning equipment to turn in a preset direction, acquire a second ADC value collected by means of the infrared sensor in real-time when the cleaning equipment is turning, and control the cleaning equipment to stop turning once the second ADC value is less than a second preset value;

the calculation module may be configured to calculate a first turn angle and a first running distance based on angle data uploaded by means of the angular velocity sensor; wherein, the angular velocity sensor is configured to collect an angle between a running direction of the cleaning equipment and an obstacle ahead;

the run straight module may be configured to control the cleaning equipment to run straight forward for the first running distance and then stop running straight;

the second turn module may be configured to control the cleaning equipment to turn the first turn angle in the preset direction, and then control the cleaning equipment to run straight.

In a possible implementation of the second aspect, the calculation module may be configured to calculate the first turn angle and the first running distance based on the angle data uploaded by means of the angular velocity sensor, wherein the calculate the first turn angle may be specifically:

when the first ADC value is greater than the first preset value, controlling the cleaning equipment to stop running straight, and controlling the angular velocity sensor to collect an angle between the running direction of the cleaning equipment and the obstacle ahead, and recording the angle as a first angle;

controlling the cleaning equipment to turn in the preset direction until the second ADC value collected by means of the infrared sensor in real-time is less than the second preset value, controlling the cleaning equipment to stop turning, and then controlling the angular velocity sensor to collect an angle between the running direction of the cleaning equipment and the obstacle ahead, and recording the angle as a second angle;

calculating the first turn angle based on the angle data of the first angle and the second angle uploaded by means of the angular velocity sensor; the first turn angle may be an absolute value of a difference between the first angle and the second angle.

In a possible implementation of the second aspect, the calculation module may be configured to calculate the first turn angle and the first running distance based on the angle data uploaded by means of the angular velocity sensor, wherein the calculate the first running distance may be specifically:

$$L1=S/\sin(|\alpha 1-\alpha 2|)$$

wherein L1 represents the first running distance, α1 represents the first angle, α2 represents the second angle, and S represents a set distance.

A control method and a control device of cleaning equipment provided by the embodiments of the present disclosure have beneficial effects of, the control method according to the embodiments of the present disclosure may include: controlling the cleaning equipment to stop running straight, when a collected first ADC value is greater than a first preset value; and then controlling the cleaning equipment to turn in a preset direction, then controlling the cleaning equipment to stop turning, when a collected second ADC value is less than a second preset value; and then calculating a first turn angle and a first running distance; next, controlling the cleaning equipment to run straight forward for the first running distance and then stop running straight, then controlling the cleaning equipment to turn the first turn angle in the preset direction, and finally controlling the cleaning equipment to run straight. In the above control method, when a shape of a pool is irregular, the cleaning equipment may be controlled to turn at a corresponding angle based on an angle between a running direction of the cleaning equipment and an obstacle ahead, so as to achieve full coverage cleaning of the irregularly shaped pool; a distance of the cleaning equipment to a pool wall may be determined in advance through the ADC value, when the cleaning equipment is about to touch the pool wall, a velocity thereof may be reduced in advance, so that the cleaning equipment will stop before touching the pool wall, so as to ensure that the cleaning equipment runs accurately according to a set path, thus ultimately improving efficiency and precision of the cleaning equipment in cleaning the pool.

DETAILED DESCRIPTION

The technical solutions in embodiments of the present disclosure will be clearly and completely described below with reference to the accompanying drawings in the embodiments of the present disclosure. Obviously, the described embodiments are only some embodiments of the present disclosure, rather than all of the embodiments. All other embodiments obtained by those of ordinary skill in the art based on the embodiments of the present disclosure without creative efforts shall fall within the protection scope of the present disclosure.

Figure 1:
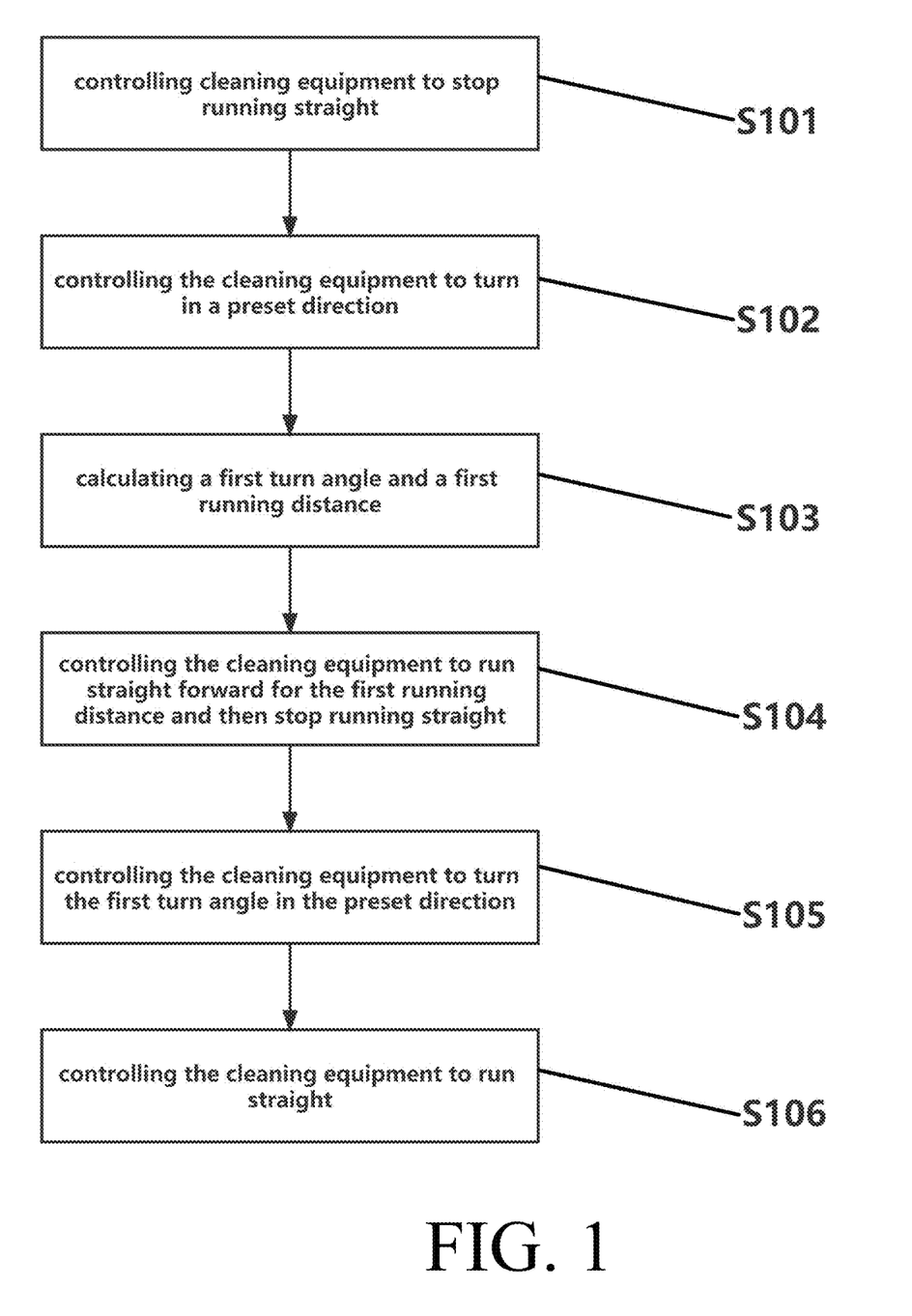
FIG. 1 is a schematic flowchart of a control method of cleaning equipment according to an embodiment of the present disclosure.

Referring to FIG. 1, FIG. 1 is a schematic flowchart of a control method of cleaning equipment according to an embodiment of the present disclosure, which may include:

S101, controlling the cleaning equipment to stop running straight.

In the embodiment, when the cleaning equipment runs straight, a first ADC value collected in real-time by an infrared sensor is acquired, and when the first ADC value is greater than a first preset value, the cleaning equipment is controlled to stop running straight.

In a specific embodiment, the first preset value may be 1700.

S102, controlling the cleaning equipment to turn in a preset direction.

In the embodiment, the cleaning equipment is controlled to turn in the preset direction, and when the cleaning equipment turns, a second ADC value collected in real-time by the infrared sensor is acquired, and the cleaning equipment is controlled to stop turning once the second ADC value is less than a second preset value.

In a specific embodiment, the second preset value may be 100.

In the embodiment, the preset direction may be either left or right.

S103, calculating a first turn angle and a first running distance.

In the embodiment, the first turn angle and the first running distance are calculated based on angle data uploaded by an angular velocity sensor; wherein the angular velocity sensor is configured to collect an angle between a running direction of the cleaning equipment and an obstacle ahead.

In a specific embodiment, the angular velocity sensor may be a gyroscope.

In a specific embodiment, when the first ADC value is greater than the first preset value, the cleaning equipment is controlled to stop running straight, and the angular velocity sensor is controlled to collect an angle between the running direction of the cleaning equipment and the obstacle ahead, and record the angle as a first angle; when the second ADC value is less than the second preset value, the cleaning equipment is controlled to stop turning, the angular velocity sensor is controlled to collect an angle between the running direction of the cleaning equipment and the obstacle ahead, and record the angle as a second angle; the first turn angle is calculated based on the angle data of the first angle and the second angle uploaded by the angular velocity sensor; the first turn angle is an absolute value of a difference between the first angle and the second angle.

In a specific embodiment, the first running distance may be calculated by a formula:

$$L1 = S/\sin(|\alpha 1 - \alpha 2|)$$

Wherein L1 represents the first running distance, α1 represents the first angle, α2 represents the second angle, and S represents a set distance. The set distance S may be in a range of:

$$0.5 \leq S \leq 2D$$

wherein D represents a body width of the cleaning equipment, and a value of D may be 50 cm.

S104, controlling the cleaning equipment to run straight forward for the first running distance and then stop running straight.

S105, controlling the cleaning equipment to turn the first turn angle in the preset direction.

S106, controlling the cleaning equipment to run straight.

Figure 2A:
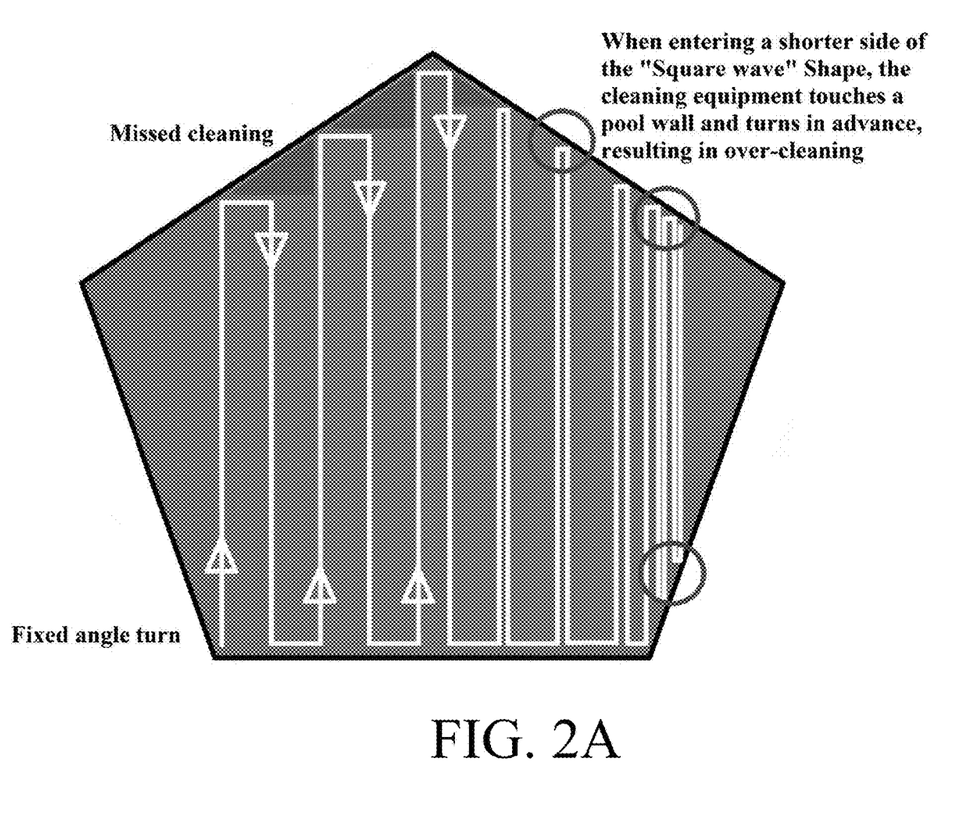
FIG. 2A is a schematic diagram of a conventional cleaning path of cleaning equipment in the prior art.
Figure 2B:
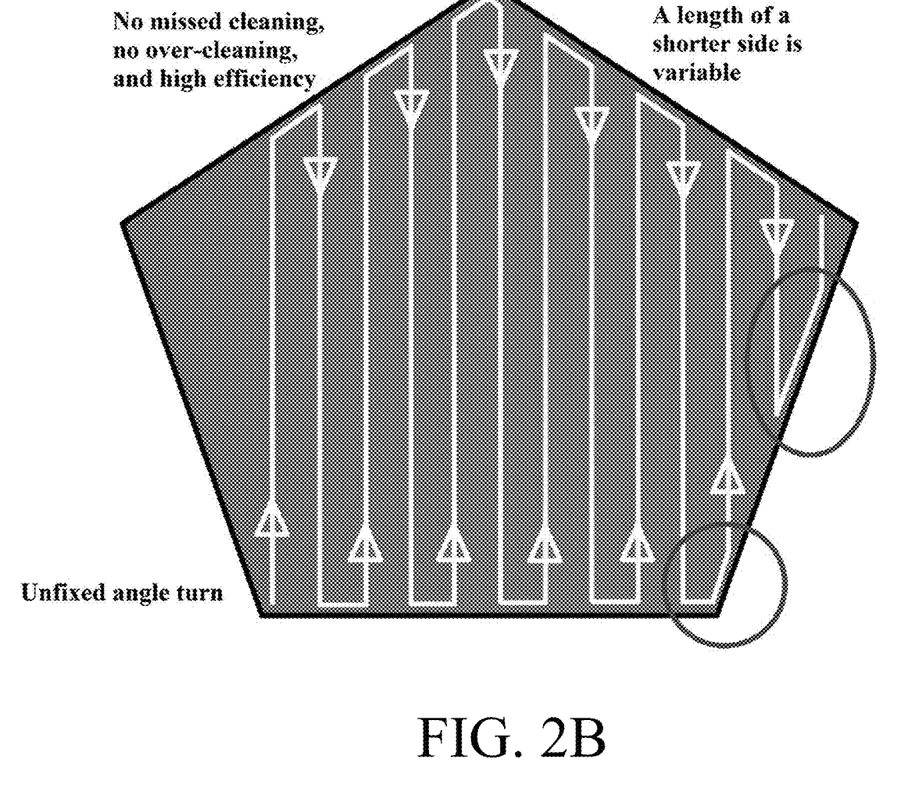
FIG. 2B is a schematic diagram of a cleaning path of cleaning equipment according to an embodiment of the present disclosure.

For a better illustration, when a shape of a pool is not a rectangle, a difference of an effect and efficiency between the control method of the present disclosure and a conventional control method, in controlling the cleaning equipment to clean the pool, may refer to FIGS. 2A and 2B.

Wherein FIG. 2A is a schematic diagram of a conventional cleaning path of cleaning equipment in the prior art, and FIG. 2B is a schematic diagram of a cleaning path of cleaning equipment according to an embodiment of the present disclosure.

It is obvious that in the conventional control method the cleaning equipment can only be made turn at a fixed angle of 90 degrees when the cleaning equipment encounters a pool wall, and a head of the cleaning equipment needs to be perpendicular to a side of the pool wall before turning. When a bottom of the pool is irregular, or when a gyroscope is offset so that the head of the cleaning equipment is not perpendicular to the side of a pool wall, it may result in poor turns. And, if a side of the cleaning equipment is not parallel to the side of a pool wall after a 90-degree turn, as shown in a darker area in FIG. 2A, a triangular area near a shorter side of a "square wave" shape will be left uncleaned, which may reduce cleaning efficiency. When the cleaning equipment is entering the shorter side of the "square wave" shape for cleaning, if the cleaning equipment touches the pool wall, the cleaning equipment may turn in advance, as shown in a circled part of FIG. 2B, resulting in two back and forth paths of the cleaning equipment being too close to each other, and the cleaning equipment almost returns to an original path after turning. Therefore, in the conventional control method, the cleaning equipment is controlled to over-clean a central area of the pool, while a cleaning of a border area of the pool is insufficient, which reduces cleaning efficiency and a cleaning effect.

In contrast, in the control method of the present disclosure, when controlling the cleaning equipment to turn once encountering the pool wall, the head of the cleaning equipment does not need to be perpendicular to the side of the pool wall, and the cleaning equipment does not need to turn according to the fixed angle of 90 degrees, but the cleaning equipment is controlled to turn at a corresponding angle according to an angle between a running direction of the cleaning equipment and an obstacle ahead. As shown in FIG. 2B, under the control of the control method of the present disclosure, a running path of the cleaning equipment is very close to the pool wall when encountering a pool wall and turning during cleaning, thereby realizing full coverage cleaning of the pool, solving the problem of missed cleaning caused by conventional control methods. Moreover, the control method of the present disclosure ensures that a distance between the two back and forth paths of the cleaning equipment is constant, and may not be changed due to a irregular shape of the pool wall, ensuring that the cleaning path is regular and fully covers the pool, thereby improving the efficiency and effect of cleaning the pool.

Figure 3:
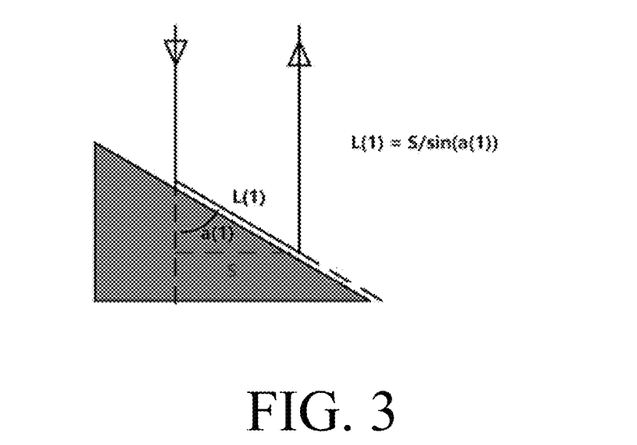
FIG. 3 is a schematic diagram of a path of cleaning equipment turning after encountering a pool wall according to an embodiment of the present disclosure.

In order to better illustrate a calculation principle of the first running distance, please refer to FIG. 3, which is a schematic diagram of a path of cleaning equipment turning after encountering a pool wall according to an embodiment of the present disclosure.

In the figure, a(1) represents a first turn angle, L1 represents the first running distance, and S represents a set distance. It can be clearly seen from FIG. 3 that a relation of the first turn angle a(1), the first running distance L1, and the set distance S meets a formula:

$$L1 = S/\sin(a(1))$$

the first turn angle a(1) is an absolute value of a difference between a first angle α1 and a second angle α2, that is:

$$a(1) = |\alpha 1 - \alpha 2|$$

therefore, the relation of the first turn angle a(1), the first running distance L1, and the set distance S may be expressed as:

$$L1 = S/\sin(a(1)) = S/\sin(|\alpha 1 - \alpha 2|)$$

through FIG. 3, the calculation principle of the first running distance L1 can be clearly understood; and according to the above formula, under a premise of different first turn angles a(1), by means of calculating different first running distances L1, it may be ensured that the distance between the two back and forth paths of the cleaning equipment is unchanged, which may be the set distance S, so that the cleaning path of the cleaning equipment can be kept regular and orderly.

Figure 4:
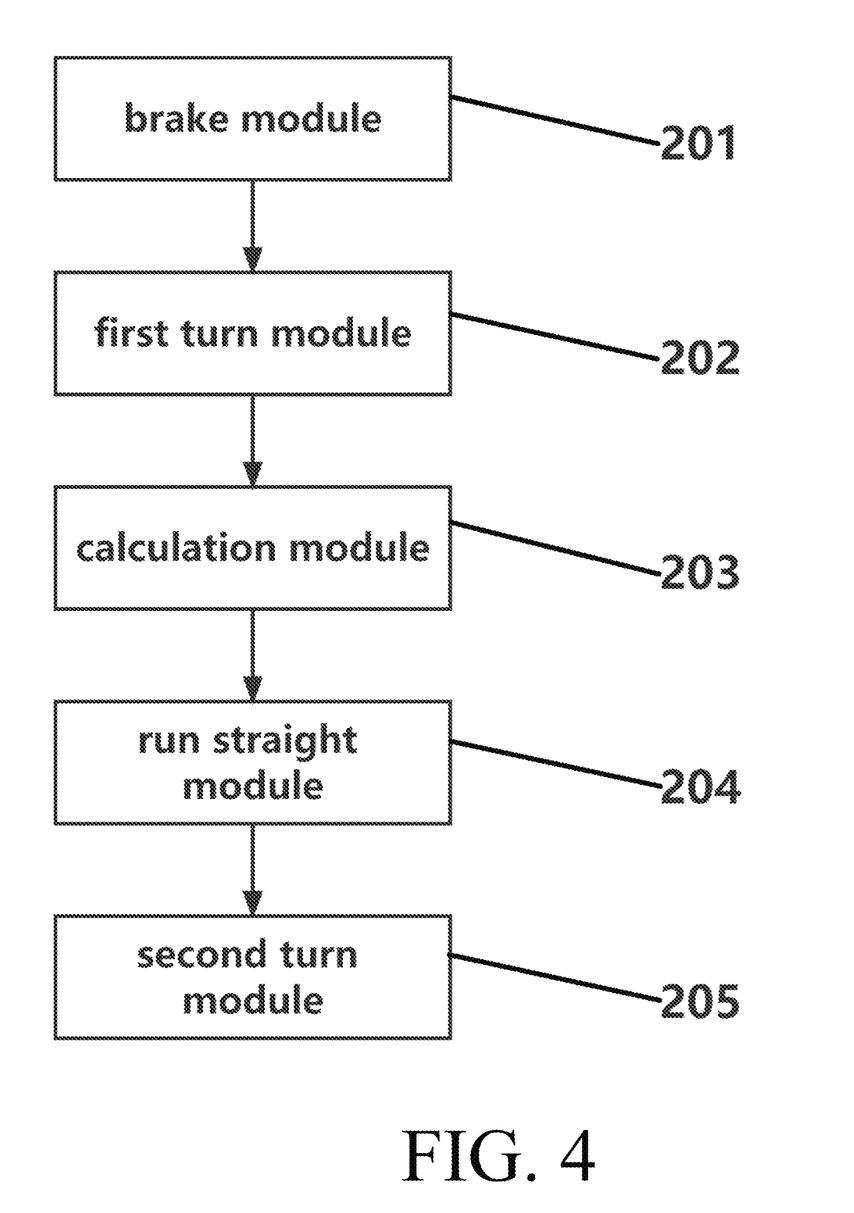
FIG. 4 is a schematic diagram of a structure of a control device of cleaning equipment according to an embodiment of the present disclosure.

In order to further illustrate the control device of the cleaning equipment, please refer to FIG. 4. FIG. 4 is a schematic diagram of a structure of a control device of cleaning equipment according to an embodiment of the present disclosure, which may include: a brake module 201, a first turn module 202, a calculation module 203, a run straight module 204, and a second turn module 205.

The brake module 201 is configured to acquire a first ADC value collected by means of an infrared sensor in real-time when the cleaning equipment is running straight, and control the cleaning equipment to stop running straight when the first ADC value is greater than a first preset value.

In a specific embodiment, the first preset value may be 1700.

The first turn module 202 is configured to control the cleaning equipment to turn in a preset direction, acquire a second ADC value collected by means of the infrared sensor in real-time when the cleaning equipment is turning, and control the cleaning equipment to stop turning once the second ADC value is less than a second preset value.

In a specific embodiment, the second preset value may be 100.

In the embodiment, the preset direction may be either left or right.

The calculation module 203 is configured to calculate a first turn angle and a first running distance based on angle data uploaded by means of an angular velocity sensor; wherein the angular velocity sensor is configured to collect an angle between a running direction of the cleaning equipment and an obstacle ahead.

In a specific embodiment, when the first ADC value is greater than the first preset value, the cleaning equipment is controlled to stop running straight, and the angular velocity sensor is controlled to collect an angle between the running direction of the cleaning equipment and the obstacle ahead, and record the angle as a first angle; when the second ADC value is less than the second preset value, the cleaning equipment is controlled to stop turning, the angular velocity sensor is controlled to collect an angle between the running direction of the cleaning equipment and the obstacle ahead, and record the angle as a second angle; the first turn angle is calculated based on the angle data of the first angle and the second angle uploaded by the angular velocity sensor; the first turn angle is an absolute value of a difference between the first angle and the second angle.

In a specific embodiment, the first running distance may be calculated by a formula:

$$L1 = S/\sin(|\alpha 1 - \alpha 2|)$$

Wherein L1 represents the first running distance, $\alpha 1$ represents the first angle, $\alpha 2$ represents the second angle, and S represents a set distance. The set distance S may be in a range of:

$$0.5D \leq S \leq 2D$$

wherein D represents a body width of the cleaning equipment, and a value of D may be 50 cm.

The run straight module 204 is configured to control the cleaning equipment to run straight forward for the first running distance and then stop running straight.

The second turn module 205 is configured to control the cleaning equipment to run straight after the cleaning equipment turns the first turn angle in the preset direction.

In the embodiment of the present disclosure, by means of the brake module 201, controlling the cleaning equipment to stop running straight, when the collected first ADC value is greater than the first preset value; and then by means of the first turn module 202, controlling the cleaning equipment to turn in a preset direction, then controlling the cleaning equipment to stop turning when the collected second ADC value is less than the second preset value; and then by means of the calculation module 203, calculating the first turn angle and the first running distance; next, by means of the run straight module 204, controlling the cleaning equipment to run straight forward for the first running distance and then stop running straight; finally, by means of the second turn module 205, controlling the cleaning equipment to turn the first turn angle in the preset direction, and then controlling the cleaning equipment to run straight. The above control device, when a shape of a pool is irregular, may control the cleaning equipment to turn at a corresponding angle based on the angle between the running direction of the cleaning equipment and the obstacle ahead, so as to achieve full coverage cleaning of the irregularly shaped pool; may determine a distance of the cleaning equipment to a pool wall in advance through the ADC value, and when the cleaning equipment is about to touch the pool wall, may reduce a velocity thereof in advance, so that the cleaning equipment will stop before touching the pool wall, so as to ensure that the cleaning equipment runs accurately according to a set path, thus ultimately improving efficiency and precision of the cleaning equipment in cleaning the pool.

The above are preferred embodiments of the present disclosure, and it should be noted that, for a person of ordinary skill in the art, several improvements and modifications may be made without departing from the principle of the present disclosure, and these improvements and modifications are also considered to be within the protection scope of the present disclosure.

The invention claimed is:

1. A control method of cleaning equipment, characterized in that, the cleaning equipment is provided with an infrared sensor and an angular velocity sensor; the control method comprises:
    acquiring a first ADC (analog to digital converter) value collected by means of the infrared sensor in real-time when the cleaning equipment is running straight, and controlling the cleaning equipment to stop running straight when the first ADC value is greater than a first preset value;
    controlling the cleaning equipment to turn in a preset direction and acquiring a second ADC value collected by means of the infrared sensor in real-time, and then controlling the cleaning equipment to stop turning once the second ADC value is less than a second preset value;
    calculating a first turn angle and a first running distance based on angle data uploaded by means of the angular velocity sensor; wherein the angular velocity sensor is configured to collect an angle between a running direction of the cleaning equipment and an obstacle ahead;
    controlling the cleaning equipment to run straight forward for the first running distance and then stop running straight, then controlling the cleaning equipment to turn the first turn angle in the preset direction, and then controlling the cleaning equipment to run straight.

2. The control method of cleaning equipment according to claim 1, characterized in that, the calculating the first turn angle and the first running distance based on the angle data uploaded by means of the angular velocity sensor, wherein the calculating the first turn angle is specifically:
    when the first ADC value is greater than the first preset value, controlling the cleaning equipment to stop running straight, and controlling the angular velocity sensor to collect an angle between the running direction of the cleaning equipment and the obstacle ahead, and recording the angle as a first angle;
    controlling the cleaning equipment to turn in the preset direction until the second ADC value collected by means of the infrared sensor in real-time is less than the second preset value, controlling the cleaning equipment to stop turning, and then controlling the angular velocity sensor to collect an angle between the running direction of the cleaning equipment and the obstacle ahead, and recording the angle as a second angle;

calculating the first turn angle based on the angle data of the first angle and the second angle uploaded by means of the angular velocity sensor; the first turn angle is an absolute value of a difference between the first angle and the second angle.

3. The control method of cleaning equipment according to claim 2, characterized in that, the calculating the first turn angle and the first running distance based on the angle data uploaded by means of the angular velocity sensor, wherein the calculating the first running distance is specifically:

$$L1 = S/\sin(|\alpha 1 - \alpha 2|)$$

wherein L1 represents the first running distance, $\alpha 1$ represents the first angle, $\alpha 2$ represents the second angle, and S represents a set distance.

\* \* \* \* \*